(12) United States Patent
Kiest, Jr.

(10) Patent No.: US 10,024,025 B2
(45) Date of Patent: Jul. 17, 2018

(54) MANHOLE LINER AND METHOD OF USING THE SAME

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

(*) Notice: Subject to any disclaimer, the term of this patent is extended or adjusted under 35 U.S.C. 154(b) by 0 days.

(21) Appl. No.: 14/729,256

(22) Filed: Jun. 3, 2015

(65) Prior Publication Data
US 2015/0267375 A1    Sep. 24, 2015

Related U.S. Application Data

(60) Division of application No. 14/445,445, filed on Jul. 29, 2014, now Pat. No. 9,074,338, which is a continuation of application No. 12/834,589, filed on Jul. 12, 2010, now Pat. No. 8,821,068.

(51) Int. Cl.
| | |
|---|---|
| *E21D 11/00* | (2006.01) |
| *B28B 19/00* | (2006.01) |
| *E02D 29/12* | (2006.01) |
| *B29C 63/20* | (2006.01) |
| *E03F 5/02* | (2006.01) |
| *E04B 1/66* | (2006.01) |

(52) U.S. Cl.
CPC ............ *E02D 29/125* (2013.01); *B29C 63/20* (2013.01); *E02D 29/12* (2013.01); *E02D 29/128* (2013.01); *E03F 5/025* (2013.01); *E04B 1/66* (2013.01)

(58) Field of Classification Search
CPC .......... B29C 63/20; E03F 5/025; E02D 29/12; E02D 29/125; E02D 29/128
USPC ............... 405/133, 150.1, 155, 184.1, 184.2; 52/20, 514, 514.5, 741.4; 138/97, 98; 156/285, 286, 293; 264/269, 314
See application file for complete search history.

(56) References Cited

U.S. PATENT DOCUMENTS

| | | | | |
|---|---|---|---|---|
| 4,714,095 A | * | 12/1987 | Muller ................ F16L 55/1656 | |
| | | | | 138/105 |
| 5,501,248 A | * | 3/1996 | Kiest, Jr. .......................... 138/98 |
| 5,706,861 A | * | 1/1998 | Wood et al. ..................... 138/98 |
| 5,736,077 A | * | 4/1998 | Kamiyama et al. ............ 264/32 |
| 6,019,136 A | * | 2/2000 | Walsh et al. .................... 138/98 |
| 8,821,068 B2 | | 9/2014 | Kiest | |

(Continued)

*Primary Examiner* — Amber R Anderson
*Assistant Examiner* — Stacy N Warren
(74) *Attorney, Agent, or Firm* — Nyemaster Goode, PC

(57) ABSTRACT

A manhole liner and a method of using the same are provided. The manhole liner is sized substantially equally to the largest diameter of the manhole, so that the liner does not have to stretch to be pressed against the manhole wall. Additionally, the liner is impregnated with a resinous material capable of curing and hardening. A bladder, preferably stretchable circumferentially and having a diameter less than the smallest diameter of the manhole, is inserted into the liner. The bladder is expanded to press the liner against the wall of the manhole to dispense resinous material from the liner, while the liner is able to fold over itself in areas having a diameter less than the original diameter of the liner. Because the bladder stretches to produce a smooth outside surface, the resinous material will migrate to areas in the folds and will cure with a smooth interior surface.

12 Claims, 7 Drawing Sheets

(56) References Cited

U.S. PATENT DOCUMENTS

2007/0113519 A1* 5/2007 Kiest, Jr. .............. E02D 29/12
52/741.3
2014/0341655 A1 11/2014 Kiest

* cited by examiner

MANHOLE LINER AND METHOD OF USING THE SAME

CROSS-REFERENCE TO RELATED APPLICATIONS

This is a divisional of U.S. patent application Ser. No. 14/445,445 filed on Jul. 29, 2014 which is a continuation of U.S. Pat. No. 8,821,068 issued on Sep. 2, 2014, which are hereby incorporated by reference in their entirety.

FIELD OF THE INVENTION

The present invention generally relates to a method and means of repairing a manhole. More particularly, but not exclusively, the invention relates to a method and assembly for lining a manhole wall.

BACKGROUND

Conventional manholes include a lower or bottom pad, a barrel having a relatively constant diameter adjacent the pad, a concentric or eccentric cone extending upwardly from the barrel, one or more adjusting rings to adjust the overall height of the manhole, and a casting frame on top of the adjusting rings to support a lid at an elevation substantially level with the surrounding pavement. The casting frame is preferably sealed to the uppermost adjusting ring to preclude or minimize water flow into the manhole.

One problem with existing manholes is that many were made long ago, and then oftentimes were made of brick. Due to the old age of the manholes, as well as the materials used to make them, many manholes have begun to deteriorate or have damaged areas. The damaged areas create weak spots, which may allow water to infiltrate the sewer system and also lead to the eventual collapse of the manhole.

Methods exist for repairing the walls of manholes. One such method involves the use of a cured-in-place (CIP) liner with a polymer coating on its interior surface and a bladder to repair the manhole wall. The liner and bladder are placed in the manhole, and the bladder is expanded to press the liner against the manhole wall. The liner is impregnated with a resin and applied to the wall to create a new interior wall of the manhole. One problem with existing methods is the size of the liner used to line the wall of the manhole. The methods call for the use of a CIP liner and bladder having a diameter approximately equal to the smallest diameter of the manhole, with the liner being capable of stretching circumferentially to press against the manhole wall so to prevent the liner from wrinkling. However, some manholes require that the liner stretch up to and exceeding 150% of its unstretched diameter. This can cause the liners to rip, tear or be too thin, leaving the manhole wall not fully repaired.

Additionally, because the liners include an interior coating impervious to a resinous material, the liners cannot fold over themselves or bunch up because the liner wall would be formed with intermediate layers of material impervious to resin causing the liner to not be homogeneous across its thickness.

Accordingly, there is a need in the art for an improved method and means that overcomes the problem of a liner tearing while stretching circumferentially to press against the wall of a manhole.

SUMMARY

It is therefore a principal object, feature, or advantage of the present invention to provide an improved method and means for lining a manhole which improves over or solves the deficiencies in the art.

Another object, feature, or advantage of the present invention is to provide an improved method and means for lining a manhole wall that allows a liner to fold over itself and to bunch up while still producing a smooth interior wall.

Another object, feature, or advantage of the present invention is to provide an improved method and means for lining a manhole wall wherein the diameter of the liner is sized to be larger than the smallest diameter of the manhole.

Another object, feature, or advantage of the present invention is to provide an improved method and means for lining a manhole wall wherein the diameter of the liner is sized to be substantially equal to a largest diameter of the manhole.

Another object, feature, or advantage of the present invention is to provide an improved method and means for lining a manhole that uses a liner to transport a resinous material capable of curing and hardening into a manhole.

Another object, feature, or advantage of the present invention is to provide an improved method and means for lining a manhole that uses a bladder capable of stretching circumferentially to press the liner against the wall of the manhole.

Another object, feature, or advantage of the present invention is to provide an improved method and means for lining a manhole that uses a liner for containing a resinous material capable of curing and hardening.

Another object, feature, or advantage of the present invention is to provide an improved method and means for lining a manhole that can be used in manholes having varying diameters along the height of the manhole.

These and/or other objects, features, and advantages of the present invention will be apparent to those skilled in the art. The present invention is not to be limited to or by these objects, features and advantages, and no single embodiment need exhibit every object, feature, and advantage.

According to one aspect of the present invention, a method of lining a manhole having varying diameters along its height is provided. The method includes taking a manhole liner having a tubular shape and an unstretched diameter larger than a smallest diameter of the manhole. The liner is impregnated with a resinous material capable of curing and hardening. The liner is positioned in the manhole, and a bladder is inserted into the liner. The bladder is then expanded to press the liner against the wall of the manhole, with the liner folding on itself along a portion of the liner. The resinous material is allowed to cure and harden to produce a smooth finished surface, including along the portion of the liner folded on itself. Finally, the bladder is removed from the manhole.

According to another aspect of the present invention, a method of lining a manhole having varying diameters along the height of the manhole and having a largest diameter near the bottom of the manhole and a smallest diameter near the top of the manhole is provided. The method includes taking a manhole liner having a diameter substantially equal to the largest diameter of the manhole. The liner is impregnated with a resinous material capable of curing and hardening, and then positioned in the manhole. An inflatable bladder capable of stretching circumferentially is inserted into the liner. Next, the bladder is inflated to circumferentially stretch the bladder to press the manhole liner into contact with the wall of the manhole. The liner is folded over itself along an upper portion of the manhole. The resinous material is allowed to cure and harden against a substantially smooth surface of the bladder, and then the bladder is removed from the manhole.

According to yet another aspect of the present invention, a liner assembly for lining a manhole having varying diameters along the height of the manhole, with the largest diameter near the bottom of the manhole and the smallest diameter near the top of the manhole, is provided. The liner assembly includes a bladder and a manhole liner. The bladder comprises a first end, and opposite second end, and a bladder body there between, wherein the bladder body has a diameter smaller than or equal to the smallest diameter of the manhole. The bladder is also capable of stretching circumferentially. The manhole liner comprises a manhole liner body along its height, with the manhole liner body having a diameter substantially equal to the largest diameter of the manhole. Additionally, the manhole liner is impregnated with a resinous material capable of curing and hardening.

DETAILED DESCRIPTION

Figure 1:
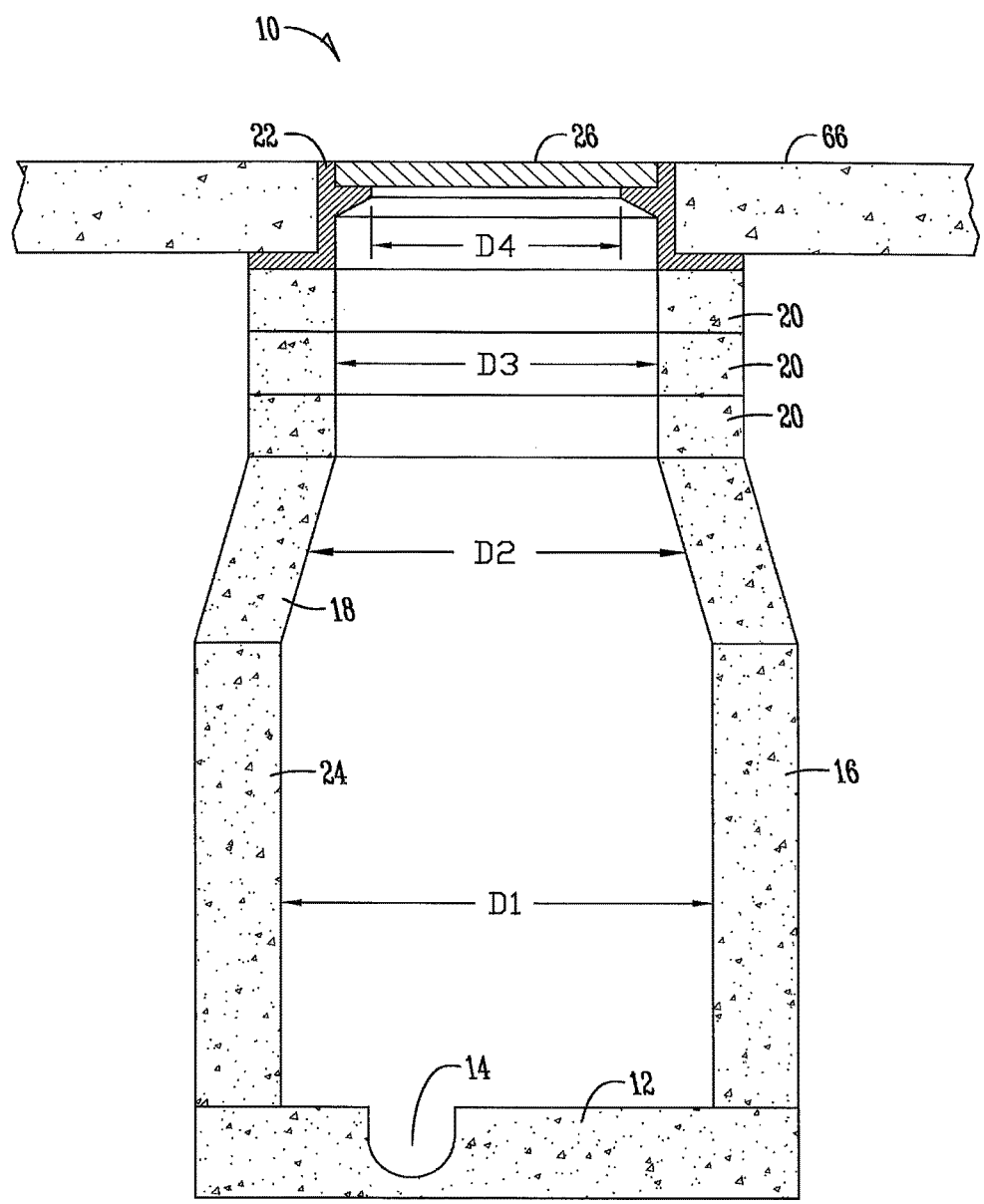
FIG. 1 is a sectional view of an exemplary structure of a manhole.

FIG. 1 is a sectional view of an exemplary structure of a manhole 10. The manhole 10 includes a bottom floor 12, a barrel 16 above the bottom floor 12, a cone 18 supported by the barrel 16, and a plurality of adjusting rings 20 supported by the cone 18. A casting frame 22 resides upon the upper most ring 20 and supports a lid 26. The casting 22 is normally sealed to the top ring 20. It is understood that one or more rings 20 may be used to adjust the height of the manhole 10 such that the lid 26 is substantially at the level of the pavement 66 surrounding the manhole 10. Also, while FIG. 1 shows the cone 18 to have a concentric shape, it is understood that an eccentric cone can be utilized such that the manhole 10 has an asymmetrical cross-sectional appearance. FIG. 1 also shows an optional run through 14 in the bottom floor 12. While each manhole generally has unique size and shape, it is generally understood that the basic construction of the manhole 10 is similar in all manholes. Although manholes comprise varying diameters D1, D2, D3, and D4 along the height of the manholes, the manholes generally are narrower at the top section, or chimney, than at the bottom section. Additionally, bricks 72 generally form the wall 24 of manholes.

Figure 2:
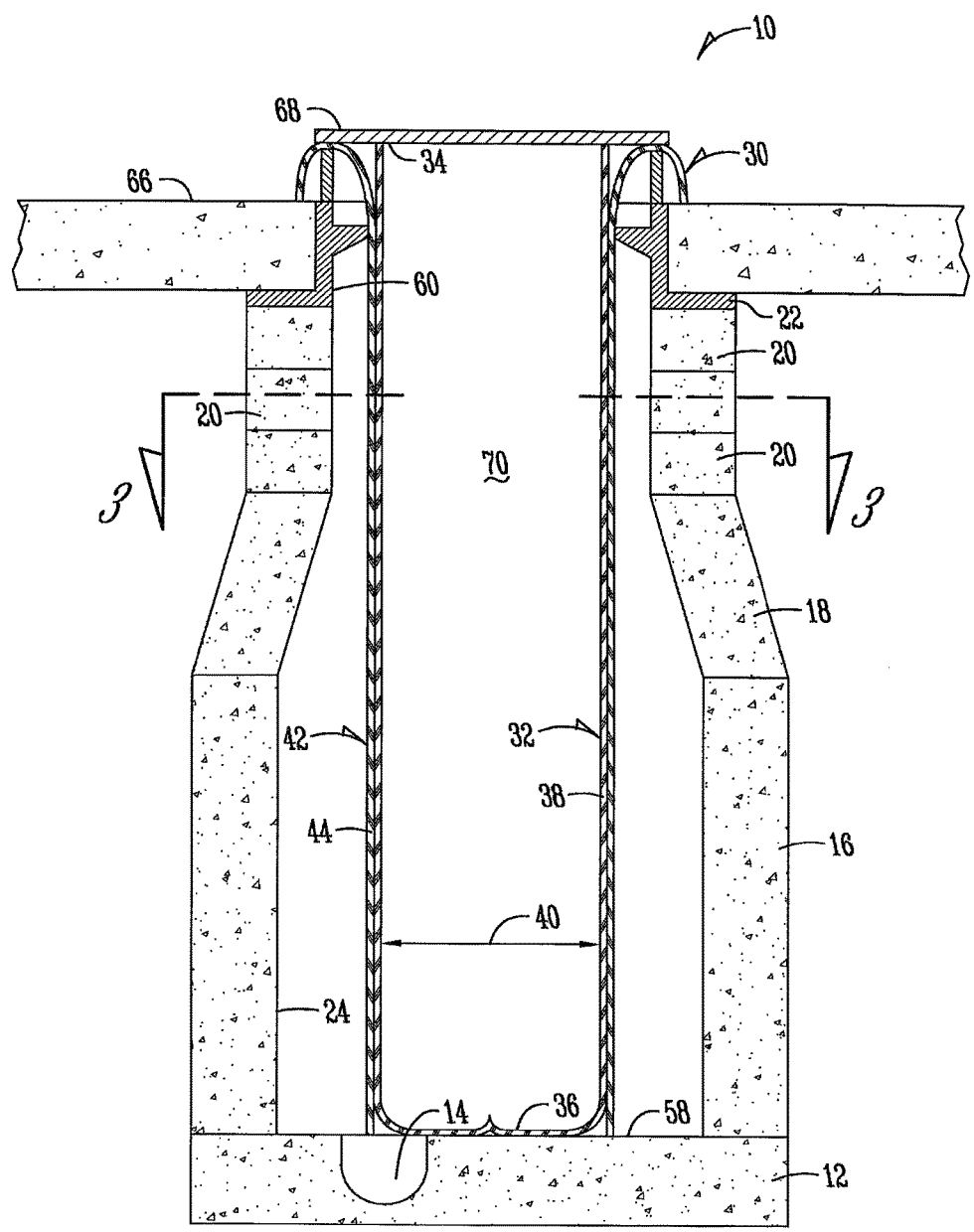
FIG. 2 is a sectional view of the liner assembly of the present invention positioned in a manhole.

FIG. 2 is a sectional view of the liner assembly 30 of the present invention positioned in a manhole 10. The liner assembly 30 includes a bladder 32, a manhole liner 42, and a base 68. The bladder 32 comprises a first end 34 attached to the base 68 near the opening 28 of the manhole 10, a second end 36 positioned at the bottom 58 of the manhole, and a bladder body 38 there between. The first end 34 of the bladder 32 may be attached to the base 68 outside of the manhole 10 as well. The diameter 40 of the bladder 32 is preferably less than or equal to the smallest diameter D1 of the manhole 10. However, the bladder body 38 is stretchable such that it is able to press against a wall 24 of the manhole 10 when expanded. The manhole liner 42 is attached at the opening 28 of the manhole, and comprises a manhole liner body 44 that at least partially surrounds the bladder body 38 in the manhole 10. The manhole liner body 44 is comprised of lining material substantially free of coating or intermediate layers of material impervious to the resinous material 48. The resinous material 48 may be a thermoset resin, which saturates the liner and cures and hardens quicker in the presence of heat. However, it should be appreciated that other resinous materials may be used, on the condition that they are able to cure and harden. The manhole liner 42 is essentially a transport device, such that the resinous material 48 forms the structural properties of the liner when cured.

Figure 3:
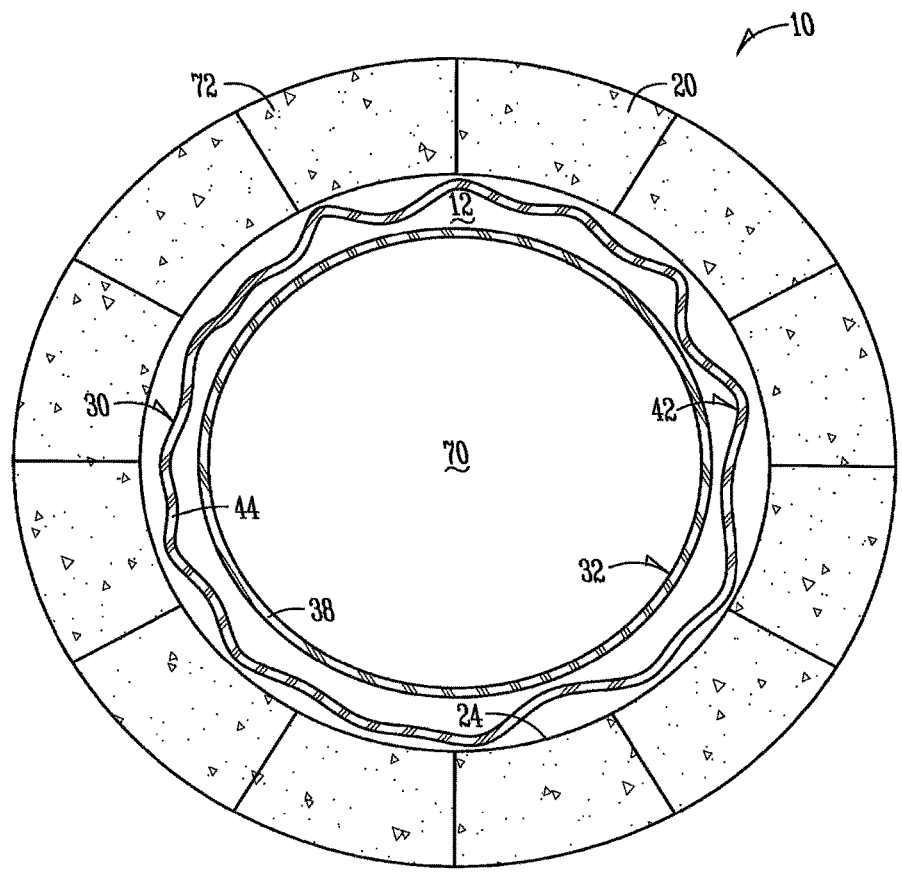
FIG. 3 is a top sectional view of the manhole of FIG. 2 according to line 3-3 of FIG. 2.

The diameter 46 of the manhole liner 42 in one preferred form is sized substantially equal to the largest diameter D1 of the manhole 10. Therefore, the manhole liner 42 does not need to be stretchable. After the manhole liner 42 has been impregnated with a resinous material 48, the manhole liner 42 is positioned in the manhole 10. The bladder 32 is then inserted into the manhole liner 42. FIG. 3 is a top sectional view of the manhole 10 of FIG. 2 according to line 3-3 of FIG. 2. FIG. 3 shows the bladder 32 and the manhole liner 42 positioned in the manhole 10. As is seen in FIG. 3, the diameter 40 of the bladder 32 is less than the diameter 46 of the manhole liner 42. As is also shown in FIG. 3, the original diameter 46 of the manhole liner 42 is substantially greater than the diameter D3 of the manhole 10 at the adjusting rings 20. Because the diameter 46 of the manhole liner 42 is greater than the diameter D3 of the adjusting rings 20, the manhole liner will fold over itself and bunch up to fit within the top section 60 of the manhole 10.

In another preferred form, the diameter 46 of the manhole liner 42 is sized larger than the smallest diameter of the manhole 10. Here, the manhole liner will again fold over on itself and bunch up to fit the smaller diameter portions of the manhole 10.

Figure 4:
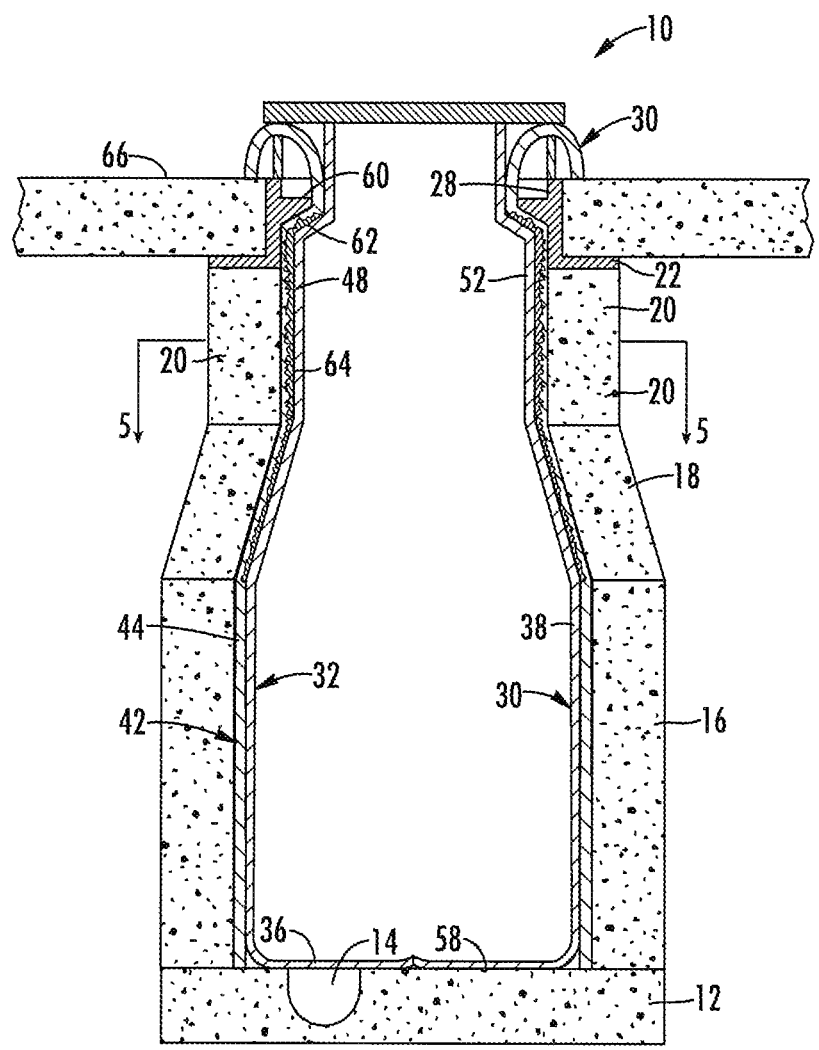
FIG. 4 is a view similar to FIG. 2 showing the bladder fully inflated in the manhole.

FIG. 4 is a sectional view similar to FIG. 2 showing bladder 32 fully inflated in the manhole 10. The bladder 32 is inflated with fluid pressure (not shown), such as air, introduced to the cavity 70 of the bladder body 38. The increased pressure causes the stretchable bladder body 38 to expand circumferentially towards the wall 24 of the manhole 10. The expanded bladder will press the manhole liner 42 against the wall 24 of the manhole 10. This will create a layer 64 of resinous material 48 between the manhole liner 42 and the bladder body 38. Because the bladder 32 has stretched circumferentially against the manhole liner 32, the bladder body 38 will have a smooth surface abutting the layer 64 of resinous material 48. This ensures that the resulting manhole wall 24 will be smooth.

Figure 5:
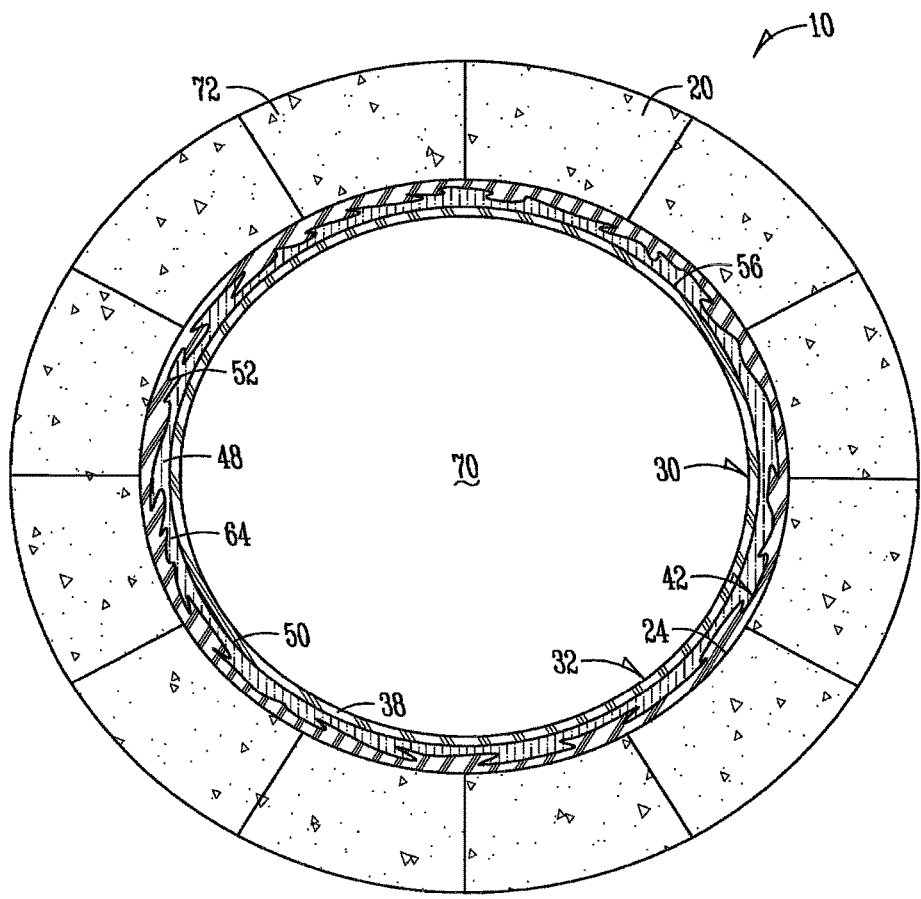
FIG. 5 is a sectional view according to line 5-5 of FIG. 4.

FIG. 5 shows a top sectional view of the manhole 10 of FIG. 4 according to the line 5-5 of FIG. 4. FIG. 5 is a sectional view of the manhole 10 near the top section 60 of the manhole 10, where the diameter D3 of the manhole is substantially smaller than the diameter D1 of the bottom 58 of the manhole 10. Because the manhole liner 42 has been sized substantially equal to the diameter D1 of the larger section of the manhole 10, there will be excess manhole liner body 44 at this upper section. The excess manhole liner body 44 will fold over itself and bunch up to create folds 52 in the liner. However, because the manhole liner 42 does not contain a resin impermeable coating, the folds 52 will compress and resinous material 48 will form a manhole liner 42 in the same way as in the bottom section, where the manhole liner 42 is a single layer. The compression creates a layer 62 of resinous material 48 between the manhole liner 42 and the bladder 32. The thickness of the layer 62 of resinous material may vary according to the number of folds 52 or bunches in the manhole liner 42. However, because the bladder 32 was stretched to press the manhole liner 42 against the wall 24 of the manhole 10, the bladder 32 will have a smooth surface 56 pressed against the varying layers of resinous material 48. This will result in the resinous material having a smooth interior surface. Because the folds 52 contain two or more layers of manhole liner 42, the resinous material 48 will cure and harden to produce a thicker wall 24 of the manhole 10 at the top section 60 of the manhole. However, because the top section 60, including the cone 18 and adjusting rings 20 (the chimney), of the manhole 10 undergoes the most stress and usually contains the most damage, the resulting thicker wall 24 will be stronger to help resist cracking due to freezing and thawing.

Figure 6:
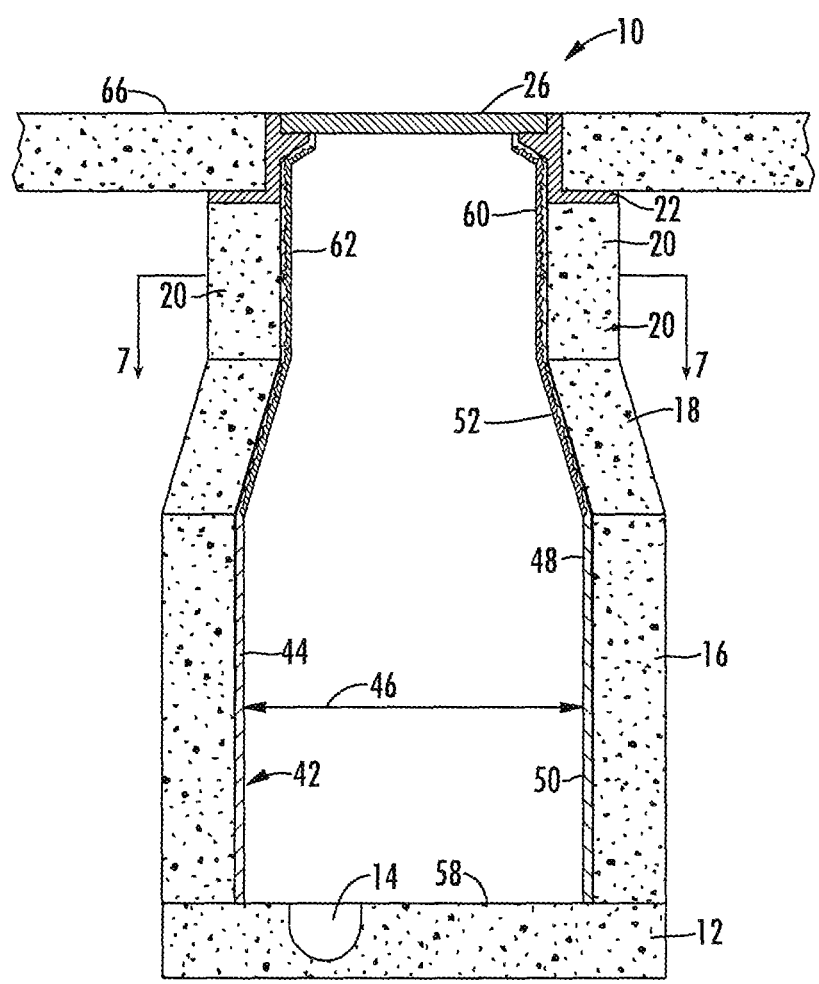
FIG. 6 is a sectional view of the repaired manhole after the bladder has been removed.

FIG. 6 is a sectional view of the manhole 10 after the resinous material 48 has cured and hardened and the bladder 32 has been removed from the manhole 10. The bladder 32 may be removed by deflating the fluid from the cavity 70, and then by pulling a rope (not shown) connected to the second end 36 of the bladder 32. Pulling the bladder 32 out by the bottom first causes the bladder 32 to peel away from the cured resinous material 48. Although peeling the bladder 32 requires the least amount of effort, it should be appreciated that the bladder 32 may also be pulled straight out of the manhole 10 from the first end 34 of the bladder 32 as well. After the manhole lid 26 is replaced on the casting frame 22 of the manhole, what remains is a manhole 10 having a repaired and structurally renewed wall 24. As is shown in FIG. 6, the manhole liner 42 has compressed the impregnated resinous material 48 from the manhole liner body 44, creating a cured resinous material layer 62 around the interior periphery of the manhole 10. As stated above, the layer 62 will be thicker in the top portion 60, or the chimney, of the manhole 10 because the manhole liner will have folded over itself. The thicker layer aids the section most affected by the elements, however. The folds 52 will occur in areas of the manhole 10 having a diameter less than the largest diameter D1 of the manhole 10.

Figure 7:
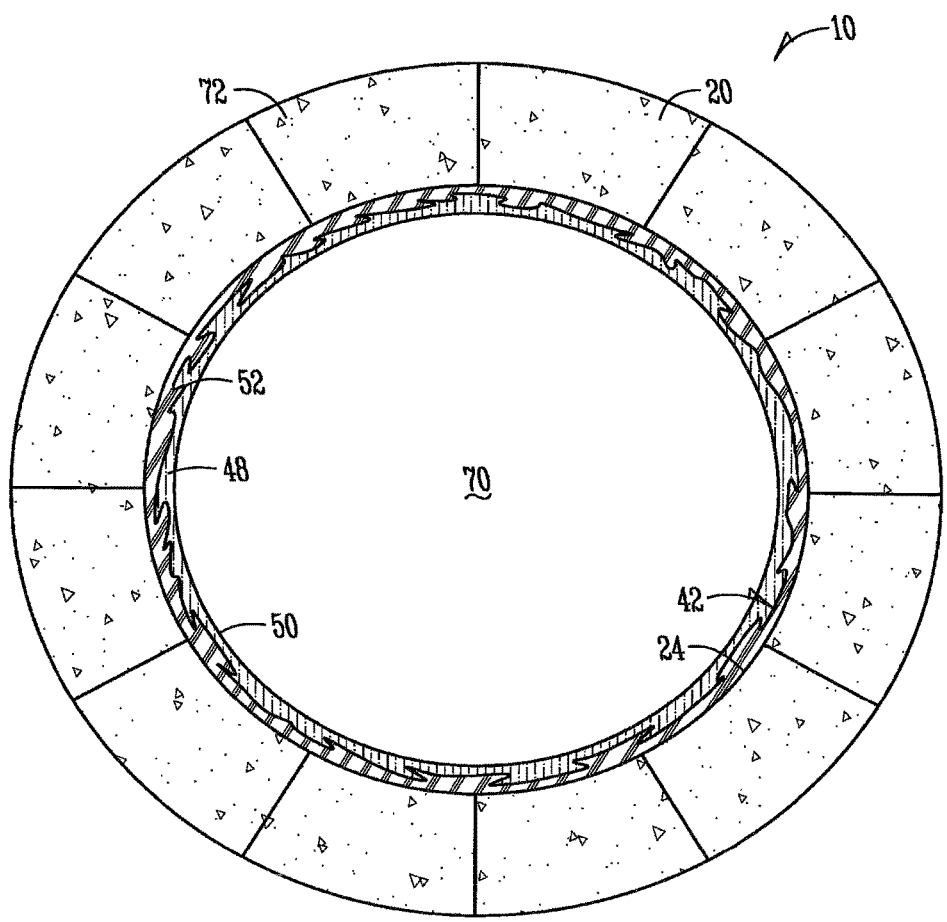
FIG. 7 is a sectional view according to line 7-7 of FIG. 6.

FIG. 7 is a top sectional view of the manhole 10 of FIG. 6 according to the line 7-7 of FIG. 6. FIG. 7 shows that although the manhole liner 42 folded over itself, the manhole liner 42 was compressed against the smooth outer surface 56 of the bladder 32, such that the interior periphery of the resinous material 48 cured into a smooth finish 50. At the upper section of the manhole, the folds 52 of the manhole liner 42 will cause the cured resinous layer 62 to be thicker than at the bottom of the manhole 10. However, because the bladder 32 is pressed against the manhole liner 42 with even pressure, the layer 62 of resinous material 48 will be substantially equal at a given height around the interior of the manhole 10. The resinous material 48 will migrate from the liner to fill low areas of the liner, formed due to the folds, to create a resinous surface that is smooth about the interior periphery of the manhole 10. The smooth finish 50 of the cured resinous material 48 allows the manhole to be used as it had previously before it required repair.

The invention has been shown and described above with reference to preferred embodiments, and it is understood that modifications, substitutions, and additions may be made which are within the intended spirit and scope of the invention. The invention is only to be limited by claims appended hereto.

What is claimed is as follows:

1. A manhole liner for lining a manhole having varying diameters along a height of the manhole, the manhole having a largest diameter toward the bottom of the manhole, a smallest diameter toward the top of the manhole, and an intermediate diameter between the bottom and the top of the manhole, the manhole liner comprising:
    a cured manhole liner positioned in the manhole;
    wherein prior to curing, the manhole liner comprises: a non-stretchable manhole liner body extending to the bottom of the manhole and configured to be moved against walls of the manhole by an inflatable bladder having a first end, an opposite second end, and a bladder body therebetween that is configured to stretch circumferentially to move the manhole liner body; the manhole liner body having a substantially uniform diameter along its height that is substantially equal to or greater than the largest diameter of the manhole; the manhole liner body configured to conform to the varying diameters of the manhole without stretching by folding over on itself and creating bunches and folds upon being moved against the walls of the manhole by the bladder in areas where the diameter of the manhole liner body is greater than the diameter of the manhole; and the manhole liner being impregnated with a resinous material configured to cure or harden to create the cured manhole liner; and
    wherein the cured manhole liner comprises areas where the manhole liner body has the bunches and folds and at least one area where the manhole liner body has no bunches and folds, the cured or hardened resinous material forming a continuous smooth inner surface in the areas where the manhole liner body has bunches and folds and in the at least one area where the manhole liner body has no bunches and folds, wherein the cured manhole liner is thicker in the areas where the manhole liner body has the bunches and folds in comparison with the at least one area where the manhole liner body has no bunches and folds.

2. The manhole liner of claim 1, further comprising the manhole liner body being tubular shaped prior to curing.

3. The manhole liner of claim 2, further comprising the manhole liner body having a seamless construction.

4. The manhole liner of claim 1, wherein the manhole liner body does not form bunches and folds in the cured manhole liner where the diameter of the manhole liner body prior to curing is substantially equal to the diameter of the manhole.

5. The manhole liner of claim 1, wherein prior to curing or hardening, the manhole liner body does not contain a resin impermeable coating, thereby allowing the resinous material to migrate from the manhole liner.

6. The manhole liner of claim 5, wherein the diameter of the cured manhole liner at the largest diameter of the manhole is larger than the diameter of the manhole at the smallest and the intermediate diameters of the manhole.

7. A manhole liner for lining a manhole having varying diameters along a height of the manhole, the manhole having a largest diameter toward the bottom of the manhole, a smallest diameter toward the top of the manhole, and an intermediate diameter between the bottom and the top of the manhole, the manhole liner comprising:
    a cured manhole liner positioned in the manhole;
    wherein prior to curing, the manhole liner comprises: a non-stretchable manhole liner body configured to be positioned in the manhole and moved against walls of the manhole by an inflatable bladder having a first end, an opposite second end, and a bladder body therebetween that is configured to stretch circumferentially to move the manhole liner body; the manhole liner body having a smallest diameter along its height that is larger than the smallest diameter of the manhole; the manhole liner body configured to conform to the varying diameters of the manhole without stretching by folding over on itself and creating bunches and folds upon being moved against the walls of the manhole by the bladder in areas where the diameter of the manhole liner body is greater than the diameter of the manhole; and the manhole liner being impregnated with a resinous material configured to cure or harden to create the cured manhole liner and configured to migrate across the manhole liner, producing a continuous smooth finished inside surface;

wherein the cured manhole liner comprises areas where the manhole liner body has the bunches and folds and at least one area where the manhole liner body has no bunches and folds, the cured or hardened resinous material forming the continuous smooth finished inside surface in the areas where the manhole liner body has bunches and folds and in the at least one area where the manhole liner body has no bunches and folds, wherein the cured manhole liner is thicker in the areas where the manhole liner body has the bunches and folds in comparison with the at least one area where the manhole liner body has no bunches and folds.

8. The manhole liner of claim 7, further comprising the manhole liner body being tubular shaped prior to curing.

9. The manhole liner of claim 7, further comprising the manhole liner body having a seamless construction.

10. The manhole liner of claim 7, wherein prior to curing, the diameter of the manhole liner body at the largest diameter of the manhole is substantially equal to the largest diameter of the manhole.

11. The manhole liner of claim 10, wherein the manhole liner body does not form bunches and folds in the cured manhole liner where the diameter of the manhole liner body prior to curing is substantially equal to the diameter of the manhole.

12. A manhole liner for lining a manhole having varying diameters along a height of the manhole, the manhole having a largest diameter toward the bottom of the manhole, a smallest diameter toward the top of the manhole, and an intermediate diameter between the bottom and the top of the manhole, the manhole liner comprising:

a cured manhole liner positioned in the manhole;

wherein prior to curing, the manhole liner comprises: a non-stretchable manhole liner body extending to the bottom of the manhole and configured to be moved against walls of the manhole by an inflatable bladder having a first end, an opposite second end, and a bladder body therebetween that is configured to stretch circumferentially to move the manhole liner body; the manhole liner body having a substantially uniform diameter along its height; the manhole liner body configured to conform to the varying diameters of the manhole without stretching by folding over on itself and creating bunches and folds upon being moved against the walls of the manhole by the bladder in areas where the diameter of the manhole liner body is greater than the diameter of the manhole; and the manhole liner being impregnated with a resinous material configured to cure or harden to create the cured manhole liner; and wherein the cured manhole liner comprises areas where the diameter of the manhole liner body was larger than the diameter of the manhole prior to curing such that the manhole liner body has the bunches and folds, and at least one area where the manhole liner body has no bunches and folds; wherein the cured manhole liner is thicker in the areas where the manhole liner body has the bunches and folds in comparison with the at least one area where the manhole liner body has no bunches and folds; and wherein the cured or hardened resinous material forms a continuous smooth inner surface in the areas where the manhole liner body has bunches and folds and in the at least one area where the manhole liner body has no bunches and folds.

\* \* \* \* \*